United States Patent [19]

Schneider

[11] Patent Number: 5,199,094
[45] Date of Patent: Mar. 30, 1993

[54] METHOD AND APPARATUS FOR MANUFACTURING AN OPTICAL CABLE

[75] Inventor: Reiner Schneider, Ebersdorf, Fed. Rep. of Germany

[73] Assignee: Siemens Aktiengesellschaft, Munich, Fed. Rep. of Germany

[21] Appl. No.: 803,562

[22] Filed: Dec. 9, 1991

[30] Foreign Application Priority Data

Dec. 21, 1990 [DE] Fed. Rep. of Germany ....... 4041274

[51] Int. Cl.[5] .............................................. G02B 6/44
[52] U.S. Cl. .................................... 385/100; 264/1.5; 427/163
[58] Field of Search .......................... 385/100; 264/1.5; 427/163

[56] References Cited

U.S. PATENT DOCUMENTS 4,983,013 1/1991 Dotzer et al. ..................... 350/96.23
4,985,185 1/1991 Mayr et al. ........................... 264/1.5

OTHER PUBLICATIONS

Yamauchi et al "Residual Stresses in Fibers in Tape-Type Optical Cable and Their Reduction"-*Transactions of the Institute of Electronics & Communications Engineers of Japan*, vol. E 63, No. 8, Aug. 1980, pp. 615-616.
Yamauchi et al "Residual Stresses in Fibers in Tape-Type Optical Cable and Their Reduction"-*Electronics and Communications in Japan*, vol. 63, No. 8, 1980, pp. 69-77.

*Primary Examiner*—Akm E. Ullah
*Attorney, Agent, or Firm*—Hill, Steadman & Simpson

[57] ABSTRACT

A method for manufacturing an optical cable characterized by forming a band of optical waveguides by mechanically combining the waveguides together and then subjecting the band to a cabling process to produce the optical cable. To reduce or eliminate torsion in the optical waveguides of the optical cable, the light waveguides are subjected to a pre-torsion prior to formation into the band in a direction opposite to the direction of torsion created by subjecting the band to a cabling process. The pre-torsion to the light waveguides is formed by an overhead haul-off of the light waveguides from a supply reel, which may be rotated to vary the amount of pre-torsion being formed.

9 Claims, 2 Drawing Sheets ns directed to a method for
manufacturing an optical cable wherein the respective
group of light waveguides are mechanically combined
to form bands or ribbons and the bands or ribbons are
subsequently subjected to a cabling process.

U.S. Pat. No. 4,983,013, whose disclosure is incorporated herein by reference thereto and which claims priority from the same German application as European Application A1 0 356 786, discloses an optical cable wherein a cable element is provided with approximately rectangular chambers. Such a structure is also referred to as a "chambered cable" and are frequently utilized together with ribbon lines, wherein a plurality of light waveguides are combined to form a band or ribbon having an approximately rectangular cross section. A plurality of these bands or ribbons are united to form a stack of bands or ribbons and the stack is matched to the respective approximately rectangularly fashioned chamber on the basis of its outside contour, which is likewise rectangularly fashioned. Since the chambers proceed helically along the core of the cable, the insertion of the bands or ribbons into the chambers implies a stranding event and this necessarily involves a torsion established by the "length of lay" of the chambers.

U.S. Pat. No. 4,985,185, whose disclosure is incorporated herein by reference thereto and which claims priority from German Application 38 08 037, discloses that light waveguides can be introduced into a chamber of a chambered cable via an appropriate guide means. To this end, the core element comprises chambers and is turned or rotated on its axis and a stationary laying means is employed. Within the framework of the kinematic reversal, of course, it is also possible to work with a rotating laying means and to only move the core element in an axial direction, but not to rotate it on its axis.

SUMMARY OF THE INVENTION

The object of the present invention is to simply diminish the torsional stresses of the light waveguides within a band or ribbon of light waveguides. In the method this object is inventively achieved in that the light waveguides have a pre-torsion impressed on them during the formation of the band or ribbon and that the following cabling process is implemented in such a way that the cabling torsions that thereby occur are directly opposite the pre-torsion of the light waveguide so that the resulting torsion on the light waveguides in the finished cable is reduced. In other words, the invention is directed to an improvement in the method for manufacturing an optical cable wherein a respective group of light waveguides are mechanically combined to form a band or ribbon and that this band or ribbon is subsequently subjected to cabling process. The improvements are reducing the torsion in each of the light waveguides by applying a pre-torsion onto each of the light waveguides during the formation of the band and the subsequent cabling process is implemented so that the torsion created during the cabling is directed opposite to the pre-torsion of the light waveguides.

With respect to the torsion, the method of the invention is, thus, implemented in two stages, namely the pre-torsion that is created in the light waveguides during the formation of the band or ribbon. The processing normally occurs so that the work in the area of manufacturing the bands or ribbons is undertaken without torsion. In the present invention, by contrast, one already proceeds so that in the first stage, a pre-torsion is produced while forming the bands or ribbons. The cabling torsion that necessarily occurs during the stranding or, respectively, during the cabling process in then designed to be directed so that, in conjunction with the pre-torsion that has already been impressed on the waveguides, the overall torsion of the light waveguides in the finished cable is reduced as a final result. In an extreme case, it is even possible to match the pre-torsion on the waveguides with the stranding torsion created during stranding the bundles in such terms of size that the resultant torsion is extremely lower or, respectively, even zero.

An especially simple solution for generating the pre-torsion in the area of manufacturing light waveguide bands or ribbons is possible in accordance with the development of the invention in that the light waveguides are hauled off overhead from the respectively supply reels. This overhead haul-off already produces a pre-torsion that, given appropriate matching to the following stranding torsion, leads to a resultant reduction of the overall torsion of the light waveguides in the finished cable.

The invention is also directed to an apparatus for implementing the method of the invention that includes supply reels for each of the light waveguides being mounted for rotation, means for hauling off the waveguides from the supply reels overhead and conveying the waveguides to coating means for applying a coating on the waveguides to form the ribbons, and stranding means being provided for receiving the ribbons of waveguides and stranding them into the cable.

Other advantages and features of the invention will be readily apparent from the following description of the preferred embodiments, the drawings and claims.

DESCRIPTION OF THE PREFERRED EMBODIMENTS

Figure 1:
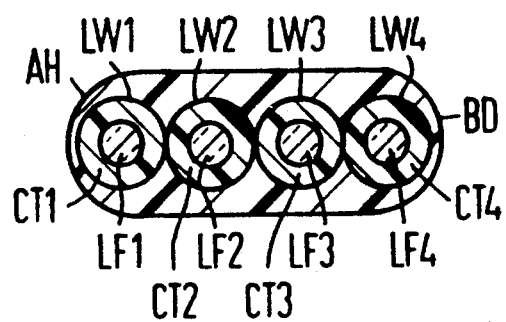
FIG. 1 is a cross sectional view through a structure of a light waveguide band or ribbon in accordance with the present invention.
Figure 2:
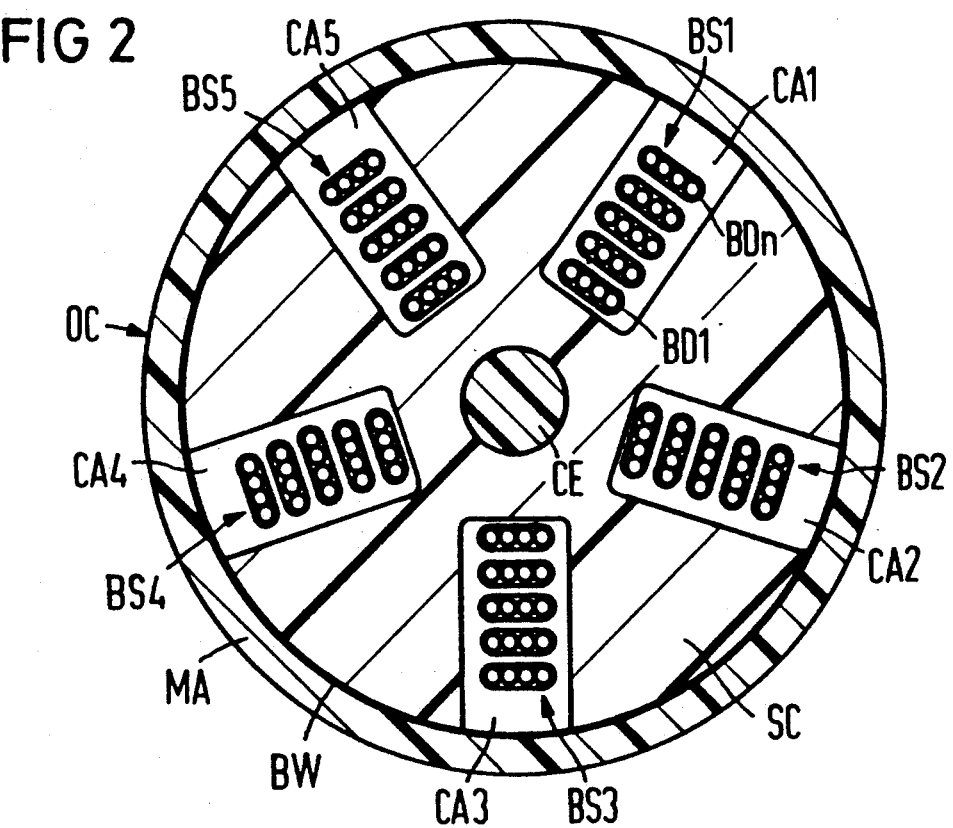
FIG. 2 is a cross sectional view of a light waveguide cable having stranded bands of light waveguides received in chambers in the core of the cable in accordance with the present invention.

The principles of the present invention are particularly useful when forming a finished optical cable, generally indicated at OC in FIG. 2 and which is illustrated as a "chambered cable". The cable OC of FIG. 2 is formed of a plurality of bands or ribbons BD, which are best illustrated in FIG. 1. The band BD in FIG. 1 is formed of four light waveguides LW1–LW4, which are received in a common sheath AH. Each of the waveguides LW1–LW4 includes an optical fiber LF1–LF4, which has at least one appropriate protective layer or coating CT1–CT4, respectively. The outside sheath AH is, for example of an ultra-violet, crosslinked polyurethane acrylate that, for example, can be composed of either an extruded plastic material, a hot-melt adhesive, or the like. The band BD obtained in this way has an approximately rectangular shape with rounded edges. The number of light waveguides present within the band BD, of course, can be selected to be different than the four illustrated, dependent on the respective requirements.

The finished optical cable OC of FIG. 2, as mentioned above, is a "chambered cable" which has a core element SC in which various radially arranged chambers CA1-CA5 are provided. The core SC includes an axially-extending tensile or supporting element CE, which is illustrated on the center of the element SC. Band stacks BS1-BS5, each of which is respectively composed of n individual bands having a configuration of the band BD of FIG. 1, are arranged inside of each of the chambers CA that open radially outward. As illustrated, in the chamber CA, there are bands BD1-BDn, with n=5, so that a stack consists of five bands. The bands themselves proceed approximately tangentially relative to the center axis of the cable and, when introduced into each of the chambers CA1-CA5, are wrapped in a helical fashion around the core and are subjected to a cabling torsion due to the helical guidance connected with this cabling process.

After inserting the bands in the chambers, the chambers CA1-CA5 are closed with a winding or covering BW. Then, an outside cladding MA, which may be a multi-layer cladding, is subsequently applied.

The stranding process, of course, also produces a torsion when various band stacks are not introduced into given chambers, but, for example, are stranded around the core in a loose configuration. Of course, a stranding torsion also occurs when the individual ribbon stacks BS1-BS5 each, respectively, preferably provided with a common outer envelope, are stranded as bundles ply-by-ply to form a cable core. In all of these instances, a stranding torsion for the individual bands is necessarily involved with the stranding process.

Figure 3:
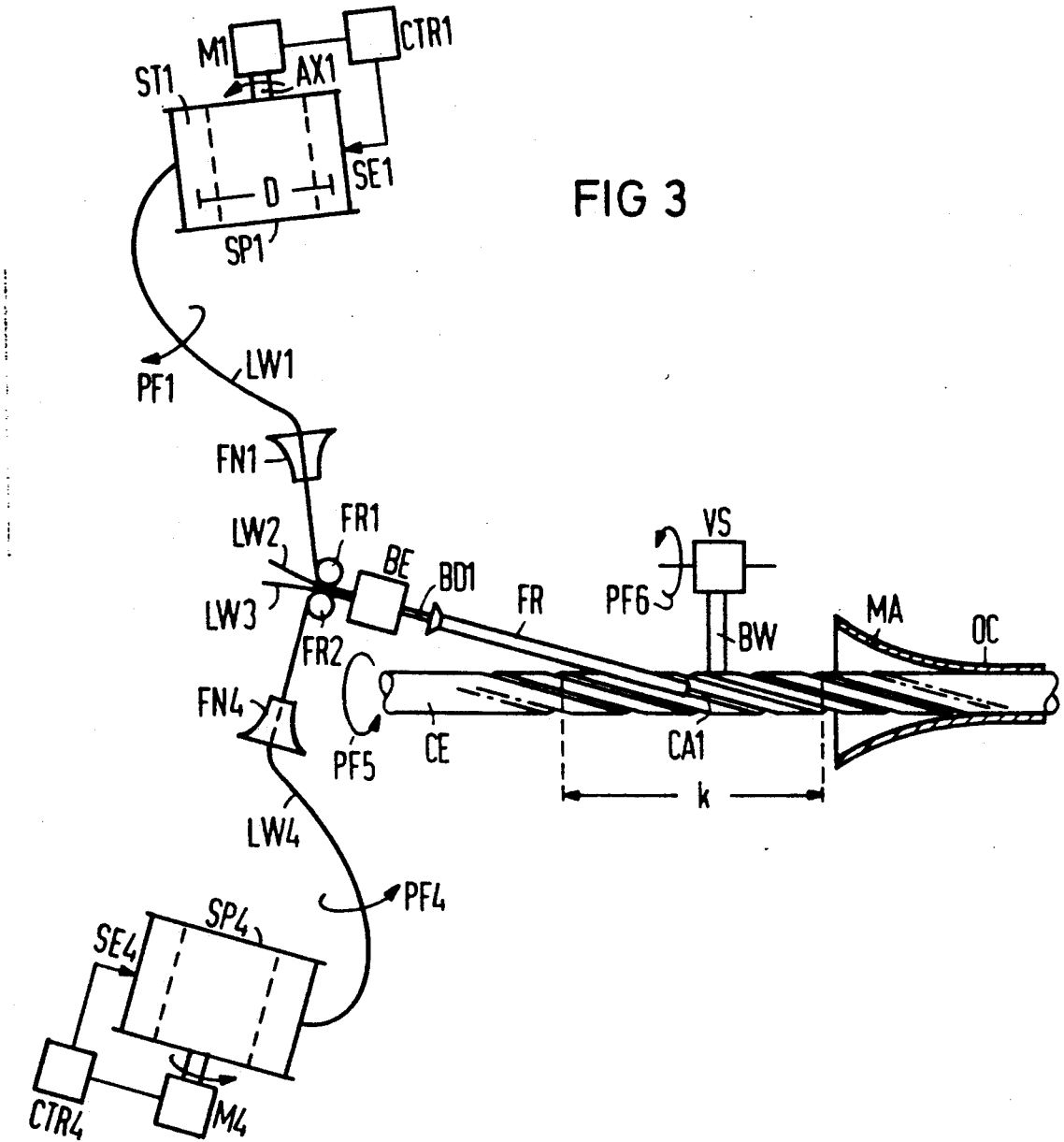
FIG. 3 is a schematic view of an apparatus for the implementation of the method in accordance with the present invention.

An apparatus for performing the method of the present invention is illustrated in FIG. 3, but only shows two supply reels SP1 and SP4 of the four supply reels necessary for manufacturing a single band BD. A haul-off of the light waveguides LW1-LW4 from the corresponding supply reels SP1-SP4 occurs overhead, and this results in that a torsion of 360° being exerted one time per turn on the light waveguides as a pre-torsion. The extent of this pre-torsion can be increased on the basis of an appropriate rotation of the supply reel during take-off, whereby a rotation of the supply reels SP1-SP4 in the haul-off direction will cause an increase in the torsion and a rotation in a direction opposite to the take-off direction will cause a decrease in the pre-torsion occurring during the overhead haul-off. For the purpose of setting this pre-torsion to an exactly desired value, each of the reels SP1-SP4 is mounted on shafts of drive motors M1-M4. The speed of each of the drive motors is variable and controlled by control means CTR1-CTR4 in order to obtain the desired, exact value.

Since the a pre-torsion of 360° will occur corresponding to exactly one turn or winding of the light waveguide being hauled off the supply reel, such as SP1, the amount of pre-torsion per length of waveguide will be dependent on the diameter of the winding being removed. Thus, with a smaller and smaller diameter, a shorter circumferential length will be removed during each haul-off to cause an increase in the pre-torsion. If desired, the diameter D of the outer remaining winding on the supply reel SP1 can be continuously sensed with a sensor SE1 which is connected to the control means CTR1 for the motor M1 to compensate for changes in the circumferential length of each loop or winding hauled off.

Upon retention of this pre-torsion indicated by the arrows PF1-PF4, the light waveguides LW1-LW4 are, first, guided in a position proceeding parallel relative to one another in order to produce a band-like structure. To accomplish this guiding, deflecting rollers or jockey rollers (not shown) are used. To this end, they proceed via guide funnels FN1-FN4 between two guide rollers FR1 and FR2 that, for example, can comprise appropriate grooves for guiding the light waveguides LW1-LW4 and, thereby, secure their parallelism. The light waveguides LW1-LW4 proceed into a coating means BE, which applies the outer layer referenced AH in FIG. 1 onto the four light waveguides LW1-LW4. On the basis of a suitable feeder or conveyor means, the band produced in this way, for example BD1 according to FIG. 2, is supplied to a guide tube FR, whose front end terminates in a corresponding chamber, such as the chamber CA1 of the core element CE of the present example. The core element CE rotates around its longitudinal axis, as indicated by the arrow PF5, so that a helical draw-in of the band BD1 occurs continuously.

In reality, of course, it is not only the band BD1 but all bands BD1-BDn that are introduced into the chamber CA1 through the guide FR. For simplification of the Figure, however, the other devices needed for this purpose have been omitted. The application of a winding BW that is hauled off from a supply reel VS and that closes the chambers CA1-CA5 of the core element CE subsequently occurs. The finished optical cable OC is then produced after the application of the cladding MA.

It is also possible to, first, wind the bands acquired with the coating BE, for example the band BD1, onto a drum and to subsequently haul it off from this drum and to implement the laying process, i.e., the insertion into the chamber CA1 via the guide tube FR. However the procedure may be designed in detail, the light waveguides LW1-LW4 of the band BD1 still have the pre-torsion received from the overhead haul-off when they enter into the chamber CA1 in any case. This pre-torsion is then selected so that in turns of direction that the stranding torsion created by the helical insertion into the chambers CA1-CA5 is directed in an opposite direction. When, thus, the overhead haul-off has undertaken so that a twisting and, thus, a torsion occurs in a clockwise direction on the waveguides, then the stranding process or, respectively, the introduction process into the chambers CA1-CA5 must be undertaken so that it creates a counter-clockwise torsion for the band, for example BD1, and, thus, for the light waveguides as well. The torsion thus obtained in the resultant, finished cable and acting on the light waveguides is, thus, lower in any case because the two torsions, including the pre-torsion and the cabling torsion, are oppositely directed and a lower, resultant value will occur.

It is assumed in general that the "length of the lay of the chambers", i.e., the length k of the helix given a full wrapping of the chamber in the core element CE is established by structural demands made of the cable and can, thus, not be varied or can be varied only to a slight extent. By contrast thereto, the degree of pre-torsion that, for example, occurs given the overhead haul-off from the supply reels SP1-SP4 is variable with the motors M1-M4 so that a total compensation is possible, for example a matching to a resultant torsion of zero. This shall be set forth in detail below with reference to numerical examples.

EXAMPLE 1a

Pitch (length of lay) k of the chambers CA1-CA5=400 mm. Average winding diameter of the haul-off reel or supply reel SP1=200 mm. Desired torsion of the light waveguide LW1=pitch (length of lay) of the chambers CA1-CA5=1 revolution/400 mm.

Given a stationary supply reel SP1, for example the motor M1 is deactivated, one revolution is applied by overhead haul-off onto $q = 200\pi = 628$ mm length (torsion = 360°), whereby the average diameter of the winding stack ST1 at the reel SP1 amounts to D=200 mm. An ideal compensation would be possible if the pitch k of the chambers amounted to exactly 628 mm. Since, however, this value k only lies at 400 mm and can normally not be changed, a reduction of the torsion otherwise occurring from k=360° C./400 mm to a value 360 $(-1+628/400) = 0.57 \cdot 360° = 205°$ is already achieved without any additional measures, i.e., practically a halving. Generally valid with k as pitch of the chamber and D as the average diameter of the core stack ST1 are:

$\phi k = 360°/k$ (degrees/length)

$\phi a = 360°/D$ (degrees/length)

$\phi x = \phi k - \phi a$ (degrees/length).

EXAMPLE 1b

As a result of an additional turning with the motor M1 by a value $\phi m$ (degrees/length), the twist and, thus, the pre-torsion onto the light waveguide LW1 can be increased to such an extent that a pre-torsion around 360° is achieved per 400 mm of hauled off length of the light waveguide LW1. The required turning of the reel SP1 in the haul-off direction is calculated in the following way:

$\phi x = 0 = \phi k - \phi a \pm \phi m$.

Required rotation: k=360°/400 mm=0.9°/mm;
Rotation due to overhead haul-off: $\phi a = 360°/D \cdot \pi = 0.57°/mm$;
Rotation by the motor M1=$\phi m = 0.9° - 0.57°/mm = 0.33°/mm$.

For a complete compensation, the additional rotation required in the haul-off direction must, thus, be selected as $\phi m = 0.33°/mm$ for the reel SP1.

This value refers to the length of the lay or pitch length k of the chamber that amounts to k=400 mm so that an additional rotation of 330° must occur with the motor per meter of hauled off light waveguide LW1 in order to achieve an exact compensation of the cabling torsion or, expressed in other terms, in order to achieve that the light waveguides within the band have a resultant torsion with a value zero in the finished cable OC. In general, a compensation to a value of exactly zero is not necessary. Residual values up to 0.2°/mm can generally be accepted without deteriorating the light waveguides.

Figure 4:
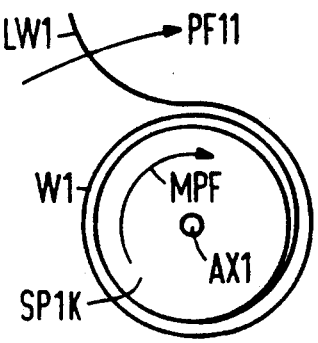
FIG. 4 is a diagrammatic sketch for explaining the hauled off portion.

Given an assumed manufacturing speed of 100 m/min, the reel SP1 is driven with a speed of 300/360·100=91.7 rpm in the haul-off direction in order to achieve the desired, exact compensation and resulting torsion of zero for the light waveguides LW1-LW4 within a band. This is schematically shown in FIG. 4 when the turn or winding (indicated by turn W1) are wound on the core SP1K of the reel SP1 in a counter-clockwise direction and the overhead haul-off occurs in a clockwise direction, as indicated by the arrow PF11. In order to increase the hauled off torsion, consequently, the rotation of the axle AX1 with the motor M1 (indicated with the arrow MPF) must occur in the same direction as the haul-off direction and, therefore, must occur in the direction of the arrow PF11.

EXAMPLE 2

The conditions can also be opposite those recited in the above examples and they become clear from the following example wherein the following conditions are assumed:
Pitch k of the chambers CA1-CA5 is k=700 mm;
Average winding diameter D of the reel SP1=150 mm;
Desired overall pre-torsion=$\phi k \cdot 360°/700$ mm=0.51°/mm.

A torsion of $\phi a = 360°/D \cdot \pi = 0.76°/mm$ occurs due to the overhead haul-off from the reel SP1. The pre-torsion $\phi a$ created only by the overhead haul-off would already be too great. The required correction $\phi m$ amounts to $\phi m = 0.51 - 0.76 = -0.25°/mm$. This means that the reel SP1 must be turned by 0.25°/mm opposite to the haul-off direction. Per meter of haul-off length of a light waveguide LW1, thus, the reel SP1 must be turned by 250° opposite the haul-off direction when an exact compensation of the torsion of the finished cable is to be achieved. Thus, the reel SP1K of FIG. 4 is rotated at this rate in a direction opposite to the arrow MPF.

Although various minor modifications may be suggested by those versed in the art, it should be understood that I wish to embody within the scope of the patent granted hereon all such modifications as reasonably and properly come within the scope of my contribution to the art.

I claim:

1. In a method for manufacturing an optical cable, which method includes providing a plurality of light waveguide supply reels, forming a group of light waveguides as a combined form of a band, and subsequently subjecting the band to a cabling process, the improvements comprising changing the torsion on the light waveguides by creating a pre-torsion on the light waveguides during the formation of the band by an overhead haul off of the light waveguides from each of the light waveguide supply reels, said pre-torsion being in a direction opposite to the direction of the torsion created during a cabling process of the band into a cable so that the resultant torsion on the light waveguides in the finished cable are diminished.

2. In a method according to claim 1, wherein the step of creating the pre-torsion of the light waveguides selects the pre-torsion so that the resultant torsion of the light waveguides in the finished cable is below 0.2°/mm.

3. In a method according to claim 1, wherein a variation of the size of the pre-torsion is created by rotating each of the supply reels during the overhead haul-off of the light waveguides therefrom.

4. In a method according to claim 3, wherein the amount of pre-torsion is selected so that the resultant torsion of the light waveguides in the finished cable is below 0.2°/mm.

5. In a method according to claim 1, wherein the step of stranding the bands strands the bands in long lays.

6. In a method according to claim 1, wherein the step of stranding the bands strands a plurality of bands.

7. In a method according to claim 6, wherein the step of stranding a plurality of bands strands the plurality of bands as a stack of bands.

8. An apparatus for forming light waveguides into a band of light waveguides and subsequently stranding the band into a finished optical cable, said apparatus including a supply reel for each of the light waveguides, means for applying a pre-torsion to each light waveguide opposite to the torsion created by subsequent stranding including means for hauling off the light waveguides overhead from the supply reel, means for directing the hauled-off waveguides into a parallel track passing through a coating means for applying a coating to the light waveguides to form a band, and stranding means for stranding the produced bands into said finished optical cable.

9. An apparatus according to claim 8, wherein each of the supply reels is mounted for rotation on a shaft of a motor, each of said motors being controlled to rotate the reel in the desired speed and direction to change the amount of pre-torsion on the waveguides so that the amount of pre-torsion on the light waveguides balances the amount of torsion created by the means for stranding to produce a resultant torsion of less than 0.2°/mm in each of the light waveguides of the finished optical cable.

* * * * *